United States Patent
Lu et al.

(10) Patent No.: US 12,536,432 B2
(45) Date of Patent: Jan. 27, 2026

(54) PRE-TRAINING METHOD OF NEURAL NETWORK MODEL, ELECTRONIC DEVICE AND MEDIUM

(71) Applicant: BEIJING BAIDU NETCOM SCIENCE TECHNOLOGY CO., LTD., Beijing (CN)

(72) Inventors: Yuxiang Lu, Beijing (CN); Jiaxiang Liu, Beijing (CN); Xuyi Chen, Beijing (CN); Shikun Feng, Beijing (CN); Shuohuan Wang, Beijing (CN); Yu Sun, Beijing (CN); Shiwei Huang, Beijing (CN); Jingzhou He, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 940 days.

(21) Appl. No.: 17/572,921

(22) Filed: Jan. 11, 2022

(65) Prior Publication Data
US 2022/0129753 A1    Apr. 28, 2022

(30) Foreign Application Priority Data
Mar. 4, 2021    (CN) .......................... 202110242141.4

(51) Int. Cl.
*G06N 3/08*    (2023.01)
*G06N 3/04*    (2023.01)

(52) U.S. Cl.
CPC ................. *G06N 3/08* (2013.01); *G06N 3/04* (2013.01)

(58) Field of Classification Search
CPC ............ G06N 3/08; G06N 3/04; G06N 3/045; G06N 3/082; G06N 3/096; G06F 40/44; G06F 40/58; G06F 40/30
See application file for complete search history.

(56) References Cited

U.S. PATENT DOCUMENTS 10,417,350 B1 *  9/2019 Mohamed .............. G06N 20/00
2018/0204111 A1   7/2018 Zadeh et al.
(Continued)

FOREIGN PATENT DOCUMENTS

CN    111310905 A    6/2020
CN    111539227 A    8/2020
(Continued)

OTHER PUBLICATIONS

Office Action for Chinese Application No. 202110242141.4, dated Apr. 29, 2022, 37 pages.
(Continued)

*Primary Examiner* — Jennifer N Welch
*Assistant Examiner* — Amy P Hoang
(74) *Attorney, Agent, or Firm* — Lippes Mathias LLP

(57) ABSTRACT

A pre-training method of a neural network model, an electronic device, and a medium. The pre-training data is inputted to the initial neural network model, and the initial neural network model is pre-trained in the first training mode, in the first training mode, the plurality of hidden layers share one hidden layer parameter, and the loss value of the initial neural network model is obtained, if the loss value of the initial neural network model is less than a preset threshold, the initial neural network model continues to be pre-trained in the second training mode, in the second training mode, each of the plurality of hidden layers has its own hidden layer parameter.

14 Claims, 7 Drawing Sheets

(56) References Cited

U.S. PATENT DOCUMENTS

| | | | |
|---|---|---|---|
| 2019/0228310 A1* | 7/2019 | Inagaki | G06N 3/047 |
| 2020/0110994 A1 | 4/2020 | Goto et al. | |
| 2021/0209304 A1* | 7/2021 | Yang | G06F 40/295 |
| 2021/0240453 A1* | 8/2021 | Badlani | G06F 8/42 |
| 2022/0083855 A1* | 3/2022 | Choi | G06F 18/2113 |
| 2023/0100376 A1* | 3/2023 | Liu | G06F 40/30 704/9 |
| 2023/0343068 A1* | 10/2023 | Yao | G06V 10/454 |

FOREIGN PATENT DOCUMENTS

| | | |
|---|---|---|
| CN | 111667069 A | 9/2020 |
| CN | 111709248 A1 | 9/2020 |
| CN | 112364160 A | 2/2021 |
| JP | 2019159694 A | 9/2019 |
| JP | 2020154076 A | 9/2020 |

OTHER PUBLICATIONS

Extended European Search Report for Application No. 22150836.9, dated Jun. 29, 2022, 13 pates.

Zhenzhong Lan et al., "ALBERT: A Lite Bert For Self-Supervised Learning of Language Representations", Published as a Conference Paper at ICLR 2020, Feb. 9, 2020, 17 pages.

Linyuan Gong et al., "Efficient Training of BERT by Progressively Stacking", Proceedings of the 36th International Conference on Machine Learning,May 14, 2019, 10 pages.

Josh Meyer, "Multi-Task and Transfer Learning in Low-Resource Speech Recognition", A Dissertation Submitted to the Faculty of the Department of Linguistics, The University of Arizona, Jul. 26, 2019, 177 pages.

Bryan A. Plummer et al., "Shapeshifter Networks: Cross-layer Parametal Sharing for Scalable and Effective Deep Learning", Jun. 18, 2020, 16 pages.

Office Action for Japanese Application No. 2021-197896, dated Nov. 29, 2022, 3 pages.

Kento Kawasaki, "Information extraction in structuring non-structured data", Information Processing Society of Japan, Dec. 2, 2020, 7 pages, English Abstract.

* cited by examiner

PRE-TRAINING METHOD OF NEURAL NETWORK MODEL, ELECTRONIC DEVICE AND MEDIUM

CROSS-REFERENCE TO RELATED APPLICATIONS

This application claims the benefit of priority to Chinese Application No. 202110242141.4, filed on Mar. 4, 2021, the contents of which are incorporated herein by reference in their entirety.

FIELD

The present disclosure relates to the Artificial Intelligence (AI) technology such as Natural Language Processing (NLP), deep learning, and the like. In particular, the present disclosure provides a pre-training method of a neural network model, an electronic device and a medium.

BACKGROUND

With the rapid development of the world economy, the frequently international cultural exchanges have, as well as the rapid development of Internet technology, and the global informationization is rapidly improved, and traditional methods that depend on manual translation cannot meet the needs of people's daily cross-language communication.

Machine translation model can automatically translate one language into another language and is one of the most powerful means for solving language barriers. In order to enhance the prediction effect of the machine translation model, it is necessary to train the machine translation model.

SUMMARY

The present disclosure provides a pre-training method of a neural network model, an electronic device, and a medium.

According to one aspect of this disclosure, a pre-training method of a neural network model includes: obtaining pre-training data; inputting the pre-training data to an initial neural network model, and pre-training the initial neural network model in a first training mode, in which a plurality of hidden layers in the first training mode share one hidden layer parameter; obtaining a loss value of the initial neural network model; and if the loss value of the initial neural network model is less than a preset threshold, continuing pre-training the initial neural network model in a second training mode, in which each of the plurality of hidden layers in the second training mode has a hidden layer parameter.

According to another aspect of this disclosure, an electronic device includes: at least one processor; a memory connected to the at least one processor; in which the memory stores instructions performed by the at least one processor to implement the pre-training method of the neural network model.

According to yet another aspect of the present disclosure, a non-transitory computer readable storage medium storing computer instructions is provided, and the computer instructions are executed by a computer to implement the pre-training method of the neural network model.

It is to be understood that the contents described in summary are not intended to identify key or important features of the embodiments of the present disclosure, nor is also intended to limit the scope of the present disclosure. Other features of the present disclosure will become easily understood by the following description.

BRIEF DESCRIPTION OF THE DRAWINGS

The drawings are for understanding of the present disclosure, and do not constitute a limitations of the present disclosure.

DETAILED DESCRIPTION

The following describes exemplary embodiments of the present disclosure with reference to the accompanying drawings, which include various details of the embodiments of the present disclosure to facilitate understanding, and should be considered as merely exemplary. Therefore, those of ordinary skill in the art should realize that various changes and modifications can be made to the embodiments described herein without departing from the scope and spirit of the present disclosure. Similarly, for clarity and conciseness, descriptions of well-known functions and structures are omitted in the following description.

After the pre-training language model represented by BIDIRECTIONAL ENCODER Representations from Transformer (BERT) appears, the pre-training language model taking Transformer as the basic structure is a research hotspot in the field of natural language processing. The study found that the model prediction effect can be improved by increasing the scale of the pre-training language model, such as increasing the number of model parameters or model layers.

Figure 1:
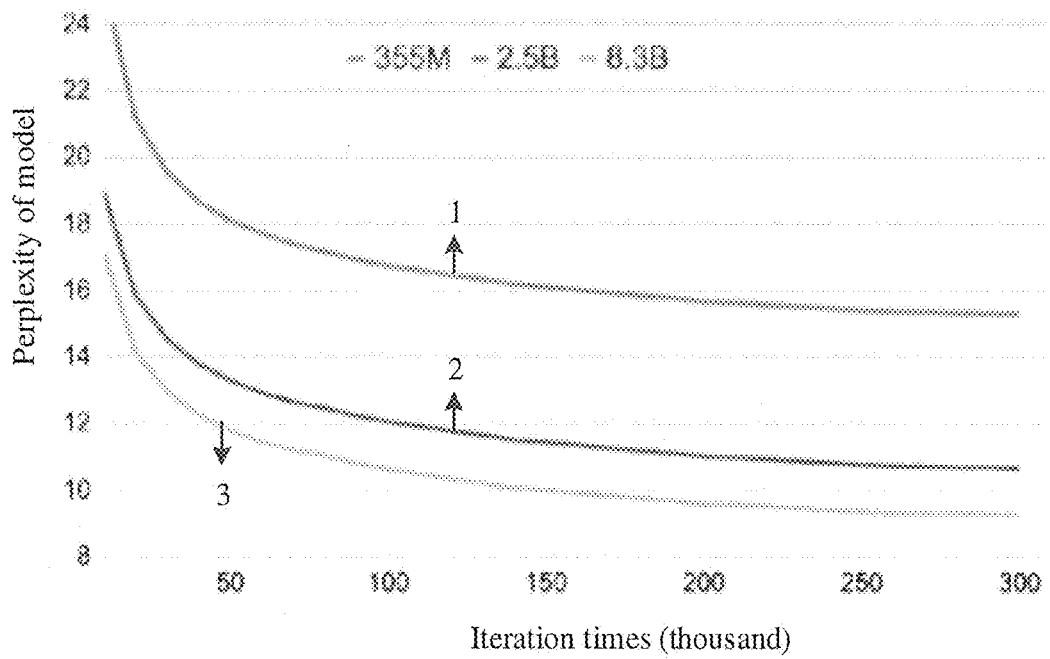
FIG. 1 is a schematic diagram of a Perplexity curve corresponding to a model at different parameters.

As an example, the model is trained by the model parameters of 355M, 2.5G, 8.3G respectively to obtain the perplexity of the model as shown in FIG. 1. Among them, the perplexity curve corresponding to the parameter of 355M is curve 1, the perplexity curve corresponding to the parameter of 2.5G is curve 2, and the perplexity curve corresponding to the parameter of 8.3G is curve 3. The lower the perplexity is, the better the model effect is. It can be seen from FIG. 1 that when the amount of the model parameters increases, the perplexity of the model decreases and the prediction effect of the model improves.

Figure 2:
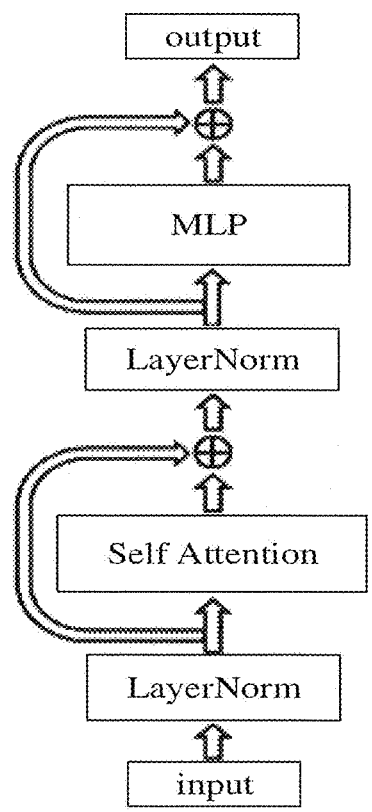
FIG. 2 is a schematic diagram of a PostLn structure employed by a pre-training language model based on Transformer as a basic structure.
Figure 3:
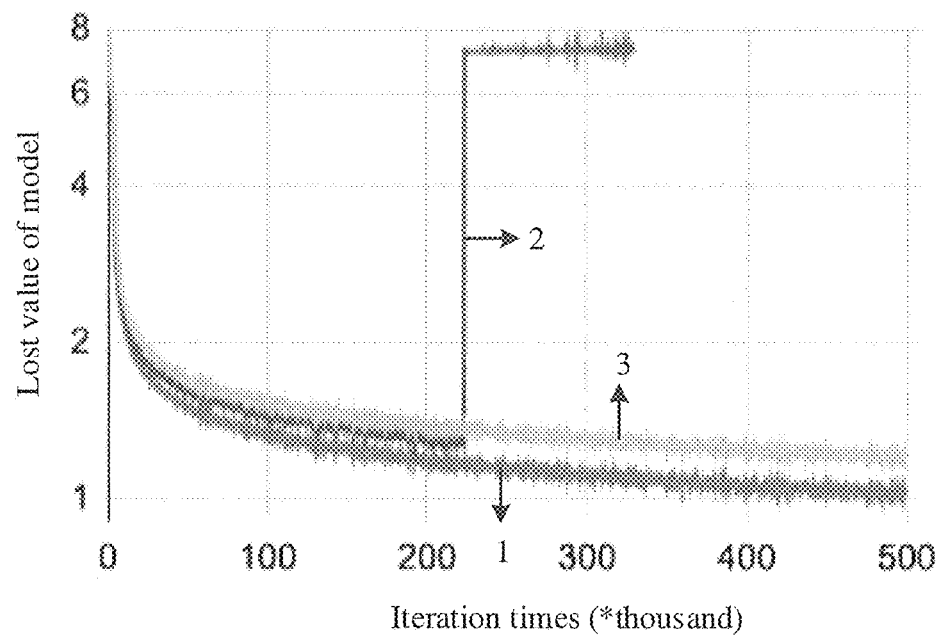
FIG. 3 is a schematic diagram of a convergence effect corresponding to the model at different parameters.

The traditional pre-training language model with Transformer as the basic structure adopts the post-layer normalization (Post-Layer Norm, PostLN) structure shown in FIG. 2. However, when the amount of model parameters is large, for example, if it is larger than 700M, the PostLN structure may cause the model to fail to converge during training, that is, the model has poor stability. For example, the model of PostLN structure is trained by the parameters of 752M and 336M to determine whether the model can converge. The test results are shown in FIG. 3. The test result corresponding to the parameter of 752M is shown in curve 2 in FIG. 3, the test result corresponding to the parameter of 336M is shown in curve 3 in FIG. 3. It can be seen that when the parameter amount is 752M, the model of the PostLN structure cannot converge normally, and when the parameter amount is 336M, the model of the PostLN structure can converge normally.

Figure 4:
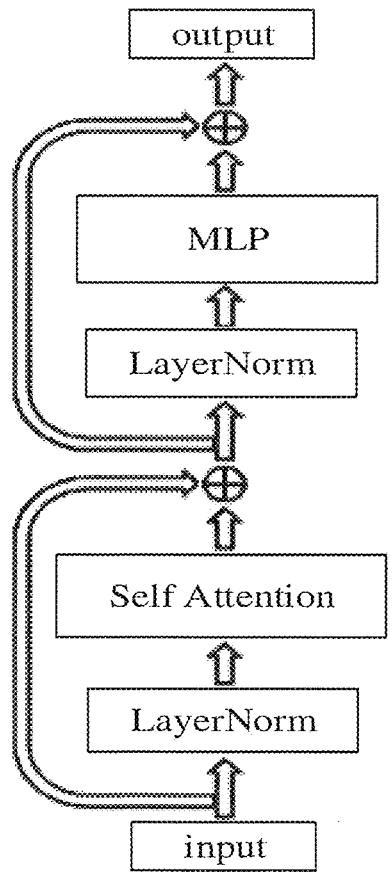
FIG. 4 is a schematic structural diagram of a preIN structure employed with a pre-training language model for transformer as a basic structure.

In related technologies, the structure of the model can be improved to the pre-layer normalization (Pre-Layer Norm, PreLN) structure as shown in FIG. 4, and the model of the PreLN structure can be trained with the parameter of 752M, to determine whether the model can converge, the test results obtained are shown in curve 1 in FIG. 3. It can be seen from curve 1 in FIG. 3 that when the parameter amount is 752M, the model of the PreLN structure can converge normally.

MLP in FIG. 2 and FIG. 4 refers to Multi-Layered Perceptron, LayerNorm refers to layer normalization, and Self Attention refers to the self-attention mechanism.

Although the model of the PreLN structure can converge when the amount of model parameters are large, the convergence effect of the model of the PostLN structure is better than that of the model of the PreLN structure within the range of the convergent parameter size.

Figure 5:
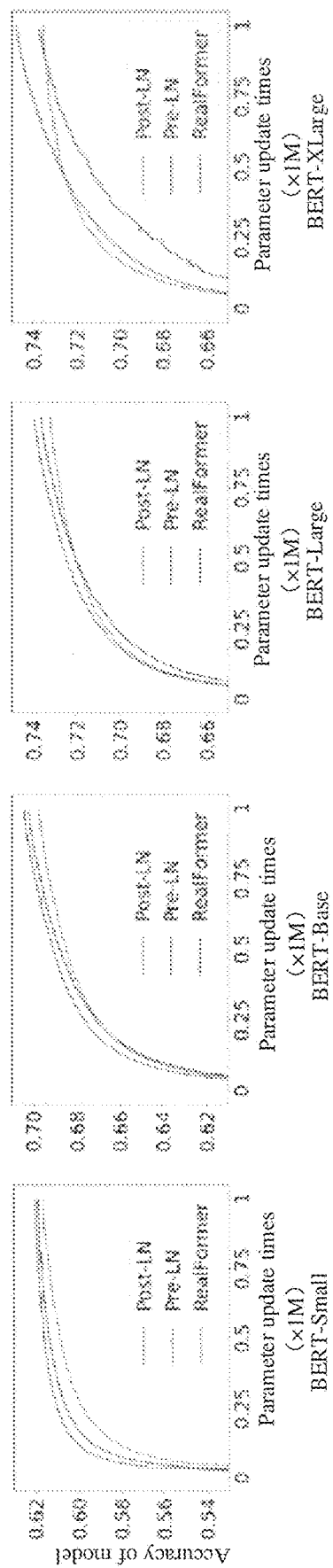
FIG. 5 is a schematic diagram showing a convergence effect of the model in different parameter quantities.

As an example, the model of the PostLN structure, the model of the PreLN structure, and the RealFromer (Residual Attention Transformer, the Transformer model that transfers the residual to the attention matrix) are tested by a small-scale parameter amount (BERT-Small), a basic scale parameter amount (BERT-Base), a large-scale parameter amount (BERT-Large) and the very large-scale parameter amount (BERT-XLarge), and the test results are shown in FIG. 5. It can be seen from FIG. 5 that the convergence effect of the model of the PostLN structure is better than that of the model of the PreLN structure within the range of convergent parameter size.

In order to further improve the convergence effect of the model while increasing the amount of model parameters, the present disclosure proposes a pre-training method and device of for a neural network model, an electronic device, and a medium.

The following describes the pre-training method and device of for the neural network model, the electronic device, and the medium of the embodiments of the present disclosure with reference to the accompanying drawings.

Figure 6:
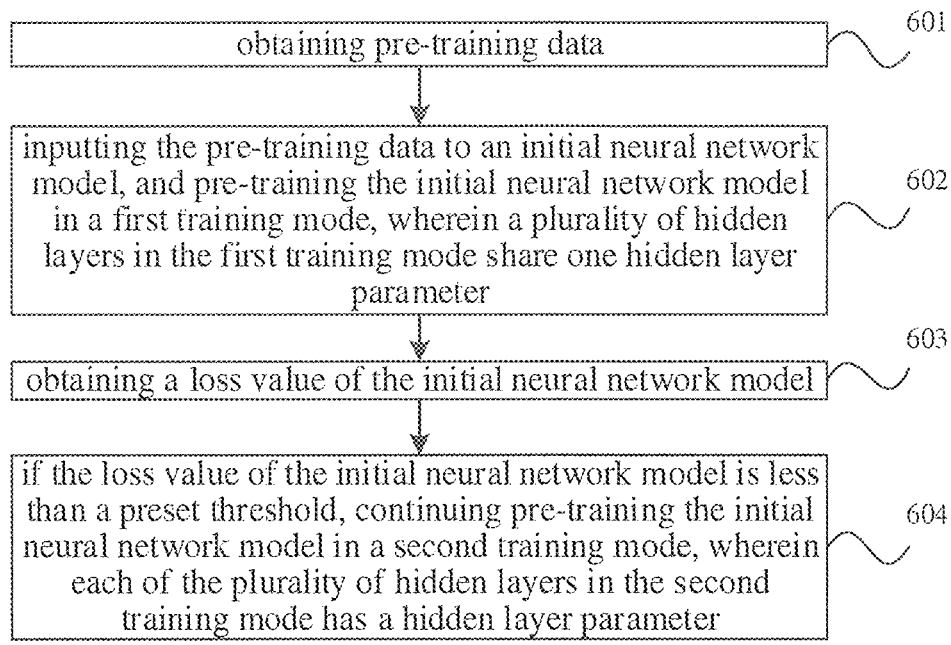
FIG. 6 is a flowchart of a pre-training method of a neural network model according to the first embodiment the present disclosure.

FIG. 6 is a flowchart of a pre-training method of a neural network model provided in the first embodiment of the present disclosure.

In the embodiment of the present disclosure, the pre-training method of the neural network model is configured in the pre-training device of the neural network model as an example. The pre-training device of the neural network model can be applied to any electronic device to make the electronic device perform the pre-training function of the neural network model.

The electronic device can be any equipment with computing capabilities, such as a personal computer (PC), a mobile terminal, a server, a mobile terminal such as a mobile phone, a tablet computer, a personal digital assistant, a wearable hardware device and a vehicle-mounted device with various operating systems, touch screens and/or display screens.

As shown in FIG. 6, the pre-training method of the neural network model may include the following steps.

Step 601: pre-training data is obtained.

In the embodiment of the present disclosure, the pre-training data can be selected according to translation requirements, the text information in each pre-training data can be text information in the same language, or text information in different languages.

For example, when the neural network model is used to translate text information in a first language into text information in a second language, where the first language is different from the second language, for example, the first language can be Chinese, and the second language can be English, or the first language may be Chinese, the second language may be French, etc., at this time, the language of the text information in each pre-training data may be the first language.

For another example, when the neural network model is used in a scenario where the first language and the second language are mutually translated, such as a Chinese-English translation, the pre-training data may include: pre-training data containing text information belonging to the first language, and/or pre-training data containing text information belonging to the second language, that is, the language of the text information in each pre-training data can be the first language, or, can also be the second language, or can contain both the first language and second language, which is not limited herein.

In the embodiments of this disclosure, pre-training data can be selected according to translation requirements. For example, pre-training data can be collected online, or pre-training data can be collected offline, or pre-training data can also be text information stored locally in the electronic device, or pre-training data can be obtained from an existing test data set, which is not limited herein.

Step 602: the pre-training data is inputted to the initial neural network model, and the initial neural network model is pre-trained in the first training mode. A plurality of hidden layers in the first training mode share one hidden layer parameter.

It should be noted that in the present disclosure, the structure of the initial neural network model is not limited. For example, the structure of the initial neural network model can be a Transformer structure, or other structures. Moreover, in the present disclosure, the type of the initial neural network model is not limited. For example, the initial neural network model may include, but is not limited to, a self-attention model, a cyclic neural network model, and so on.

In this embodiment of the disclosure, after the pre-training data is obtained, the pre-training data can be inputted to the initial neural network model, and the initial neural network model can be pre-trained in the first training mode, where the plurality of hidden layers in the first training mode share one hidden layer parameter.

Therefore, when the initial neural network model is pre-trained, the plurality of hidden layers share the same hidden layer parameters. Compared with the corresponding hidden layer parameters being used by each hidden layer, the number of parameters is relatively reduced. Therefore, during the pre-training, the instability caused by parameter updates can be reduced, and the convergence effect of the model can be improved.

Step 603: a loss value of the initial neural network model is obtained.

In this embodiment of the disclosure, during the pre-training process, the loss value of the initial neural network model can be obtained, where the smaller the loss value is, the better the training effect of the model is.

Step 604: when the loss value of the initial neural network model is less than a preset threshold, the initial neural network model is pre-trained continually in a second training mode. Each of the plurality of hidden layers in the second training mode has a hidden layer parameter.

In the embodiment of the present disclosure, the preset threshold is set in advance, and the preset threshold can be set according to actual application requirements and application scenarios. It should be understood that the preset threshold is a smaller value.

In the embodiment of the present disclosure, when the loss value of the initial neural network model is less than the preset threshold, at this time, the prediction accuracy of the model is relatively high. At this time, in order to further improve the prediction effect of the model, the second training mode can be used to continue pre-training the initial neural network model, and each of the plurality of hidden layers in the second training mode has a hidden layer parameter.

Therefore, the pre-training is divided into two stages. In the first stage, the plurality of hidden layers share the same hidden layer parameters. Compared with the corresponding hidden layer parameters being used by each hidden layer, the number of parameters is relatively reduced. Therefore, during the pre-training, the instability caused by parameter updates can be reduced, and the convergence effect of the model can be improved. In the second stage, the corresponding hidden layer parameters are used by each hidden layer, the prediction effect of the model may be improved. That is to say, this method can not only improve the convergence effect of the model, but also improve the prediction effect of the model.

In the pre-training method of the neural network model of the embodiment of the disclosure, the pre-training data is inputted into the initial neural network model, and the initial neural network model is pre-trained in the first training mode, in the first training mode, the plurality of hidden layers share one hidden layer parameter and the loss value of the initial neural network model is obtained. If the loss value of the initial neural network model is less than the preset threshold, the initial neural network model will continue to be pre-trained in the second training mode. Among them, each of the plurality hidden layers in the second training mode has a hidden layer parameter. Therefore, the pre-training is divided into two stages. In the first stage, each hidden layer shares the same hidden layer parameters. Compared with the corresponding hidden layer parameters being used by each hidden layer, the number of parameters is relatively reduced. Therefore, during the pre-training, the instability caused by parameter updates can be reduced, and the convergence effect of the model can be improved. In the second stage, the corresponding hidden layer parameters are used by each hidden layer, the prediction effect of the model may be improved. That is, this method can not only improve the convergence effect of the model, but also improve the prediction effect of the model.

In a possible implementation of the embodiment of the present disclosure, part of the pre-training data can be masked, and the initial neural network model is used to predict the characters at the masked position, and the loss value of the initial neural network model is generated according to the prediction result of the initial neural network model and the actual masked characters at the mask position. The above process will be described in detail below in conjunction with FIG. 7.

Figure 7:
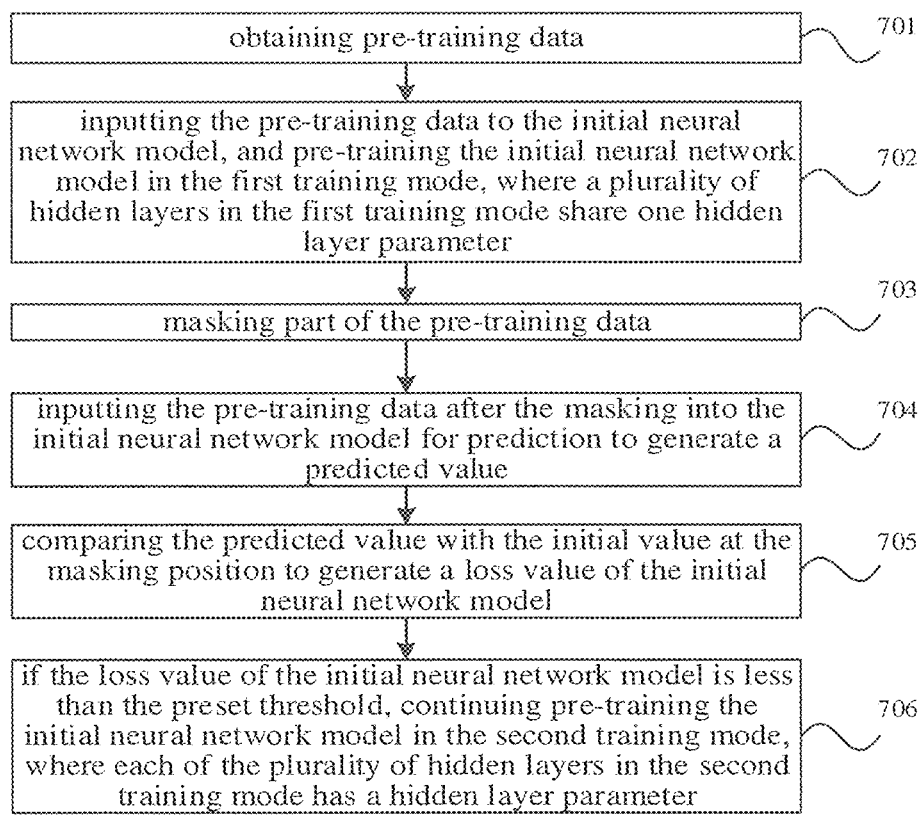
FIG. 7 is a flowchart of a pre-training method of a neural network model according to the second embodiment of the present disclosure.

FIG. 7 is a flowchart of the pre-training method of the neural network model according to the second embodiment of the present disclosure.

As shown in FIG. 7, the pre-training method of the neural network model may include the following steps.

Step 701: pre-training data is obtained.

Step 702: the pre-training data is inputted to the initial neural network model, and the initial neural network model is pre-trained in the first training mode. A plurality of hidden layers in the first training mode share one hidden layer parameter.

The execution process of steps 701 to 702 may refer to the execution process of steps 101 to 102 in the foregoing embodiment, and details are not described herein.

Step 703: part of the pre-training data is masked.

In this embodiment of the disclosure, the masking may refer to removing part data (such as one or more characters) in the pre-training data, or may also refer to replacing part data in the pre-training data, which is not limited herein.

As an example, the masking is removing part data in the pre-training data. Assume that the pre-training data is "the custom of the Yuan Xiao Festival is to eat glutinous rice balls". "Xiao" is removed, and the pre-training data after masking is "the custom of the Yuan festival is to eat glutinous rice balls".

As another example, the masking is replacing part data in the pre-training data. Assuming that the pre-training data is "the custom of the Yuan Xiao Festival is to eat glutinous rice balls", "Xiao" in the pre-training data is replaced with "Dan", and the pre-training data after masking is "The custom of Yuan Dan Festival (New Year) is to eat glutinous rice balls".

Step 704: the pre-training data after the masking is inputted into the initial neural network model for prediction to generate a predicted value.

The predicted value refers to a mask character at the masking position predicted by the initial neural network model.

In the embodiment of the present disclosure, the initial neural network model may be used to predict the pre-training data after the masking to generate the predicted value at the masking position.

Still taking the above example, the initial neural network model predicts the pre-training data after the masking, and the generated prediction value can be "Xiao".

Step 705: the predicted value is compared with the initial value at the masking position to generate a loss value of the initial neural network model.

In the embodiment of the present disclosure, the initial value refers to an actual mask character at the masking position in the pre-training data.

In a possible implementation of the embodiment of the present disclosure, the loss value of the initial neural network model can be generated according to the difference between the predicted value and the initial value, where the loss value of the initial neural network model is in a positive relationship with the above-mentioned difference, that is, the smaller the difference between the predicted value and the initial value is, the smaller the loss value is.

In a possible implementation of the embodiment of the present disclosure, the similarity between the predicted value and the initial value can be calculated based on a similarity calculation algorithm, and the difference between the predicted value and the initial value can be determined according to the similarity. Among them, the similarity and the difference have a negative relationship. After that, the loss value of the initial neural network model can be determined according to the difference between the predicted value and the initial value, where the loss value has a positive relationship with the above-mentioned difference.

It should be understood that the initial neural network model predicts the pre-training data after the masking. If the prediction is correct, the difference between the predicted mask character and the actual mask character is 0. At this time, the model prediction accuracy is high, and if the prediction is not correct, the difference between the predicted mask character and the actual mask character is large. At this time, the prediction effect of the model is not good, and the initial neural network model needs to be pre-trained to improve the prediction effect of the model.

Step 706: when the loss value of the initial neural network model is less than the preset threshold, the initial neural network model is pre-trained continually in the second training mode. Each of the plurality of hidden layers in the second training mode has a hidden layer parameter.

The execution process of step 706 refers to the execution process of step 104 in the foregoing embodiment, and details are not described herein.

The pre-training method of the neural network model of the embodiment of the disclosure generates the loss value of the initial neural network model according to the prediction result of the initial neural network model and the actual mask character at the masking position, and the generated loss value can indicate the prediction accuracy of the initial neural network model, so that when the loss value indicates that the prediction accuracy of the initial neural network model is low, the model can continue to be pre-trained to improve the prediction effect of the model.

In a possible implementation of the embodiment of the present disclosure, when the first training mode is used to train the initial neural network model, the neural network model can be pre-trained in a cyclic manner to improve the prediction effect of the model. The above process will be described in detail below with reference to FIG. 8.

Figure 8:
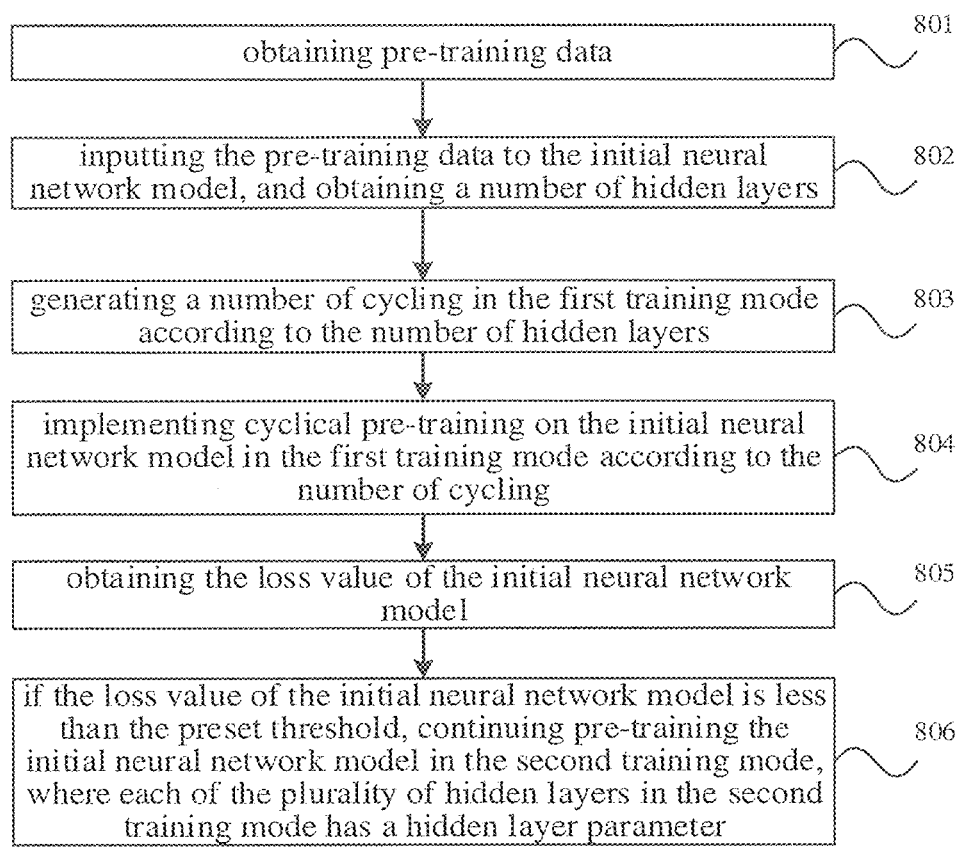
FIG. 8 is a flowchart of a pre-training method of a neural network model according to the third embodiment of the present disclosure.

FIG. 8 is a flowchart of the pre-training method of the neural network model according to the third embodiment of the present disclosure.

As shown in FIG. 8, the pre-training method of the neural network model may include the following steps.

Step 801: pre-training data is obtained.

The execution process of step 801 refers to the execution process of step 101 in the foregoing embodiment, and details are not described herein.

Step 802: the pre-training data is inputted to the initial neural network model, and a number of hidden layers is obtained.

In the embodiments of the present disclosure, the number of hidden layers can be determined according to the structure of the initial neural network model.

For example, the initial neural network model is the pre-trained language model of the Transformer structure. Normally, the pre-trained language model of the Transformer structure can be represented by L(n)H(m), where L is the number of layers of the Transformer Encoder, that is, there are n layers of Transformer Encoder that are stacked to each other, that is, the number of hidden layers is n; H is the Hidden size of the Transformer Encoder, that is, the width of the hidden layer is m. When the initial neural network model is L48H4096, the initial neural network model is a Transformer model with 48 hidden layers and Hidden size of 4096.

Step 803: a number of cycling in the first training mode is generated based on the number of hidden layers.

Among them, the plurality of hidden layers in the first training mode share one hidden layer parameter.

In the embodiment of the present disclosure, the number of the cycling training in the first training mode can be determined according to the number of hidden layers. Among them, the number of cycling has a positive relationship with the number of hidden layers, that is, the larger the number of hidden layers is, the more cycling is, so as to improve the prediction accuracy of the model. For example, the number of cycling may be the same as the number of hidden layers.

Step 804: cyclical pre-training is implemented on the initial neural network model in the first training mode according to the number of cycling.

In the embodiment of the present disclosure, the cyclical pre-training is implemented on the initial neural network model in the first training mode according to the number of cycling. Optionally, the number of cycling is marked as N.

In a possible implementation of the embodiment of the present disclosure, in the first cycle, each hidden layer can use the initial hidden layer parameters as the shared hidden layer parameters for pre-training. In the pre-training process, each hidden layer can accumulate its own gradient value to the shared hidden layer parameters, that is, each hidden layer can jointly correct the shared hidden layer parameters, and the output of the first cycle of the model is taken as the input of the second cycle. In the second cycle, each hidden layer can use the updated shared hidden layer parameter for pre-training. During the pre-training process, each hidden layer can continue to generate its own gradient value and accumulate the gradient value on the updated shared hidden layer parameter, that is, each hidden layer can jointly modify the updated shared hidden layer parameter, and the output of the second cycle of the model is taken as the input of the third cycle. By analogy, the output of the (N-1)th cycle of the model can be used as the input of the Nth cycle, and during the (N-1)th cycle, each hidden layer can accumulate its own gradient value on the shared hidden layer parameter to obtain updated shared hidden layer parameter as the shared hidden layer parameter used by each hidden layer in the Nth cycle, during the pre-training process, each hidden layer can continue to accumulate its own gradient value to the updated shared hidden layer parameters, that is, each hidden layer can continue to modify the updated shared hidden layer parameter. Therefore, by modifying the shared hidden layer parameters during each cycle, the training effect of the model can be guaranteed.

In this disclosure, a plurality of hidden layers share the same hidden layer parameter, and the calculation of the plurality of layers is performed by cycle input and output, that is, the input of the first cycle is input_1 and the output is output_1; the input of the second cycle is output_1, the output is output_2, the input of the third cycle is output_2, the output is output_3, and so on, the final output is output_N. Therefore, by adopting the cycle method, the initial neural network model is pre-trained. Due to the cycle structure, the dependence between gradients is enhanced, and the problem of gradient disappearance can be solved to a certain extent, thereby ensuring the effectiveness of convergence.

Step 805: the loss value of the initial neural network model is obtained.

The execution process of step 805 may refer to the execution process of step 103 in the foregoing embodiment, or may also refer to the execution process of steps 203 to 205 in the foregoing embodiment, which will not be repeated here.

Step 806: when the loss value of the initial neural network model is less than the preset threshold, the initial neural network model is pre-trained continually in the second training mode. Each of the plurality of hidden layers in the second training mode has a hidden layer parameter.

In a possible implementation of the embodiments of the present disclosure, when the second training mode is used to pre-train the initial neural network model, the initial hidden layer parameter used by each hidden layer may be the updated shared hidden layer parameter obtained after the initial neural network model is pre-trained for the last cycle in the first training mode. In the process of continuing pre-training the initial neural network model by using the second training mode, each hidden layer can update the hidden layer parameters used by the hidden layer.

In other words, the multi-layer cyclic structure can be expanded, and the hidden layer parameters are no longer shared among the hidden layers. The initial parameters of each hidden layer can be the previously shared parameters. During the pre-training process, each hidden layer updates the corresponding hidden layer parameters according to their respective gradients.

In summary, the pre-training in the present disclosure includes two stages. The first stage is: pre-training the initial neural network model using the cycle shared parameter structure. In each cycle process, each hidden layer generates its own gradient and accumulates the gradient on the same shared hidden layer parameters, so as to stabilize the update of the parameters, so that the model can converge normally. Under the cycle shared parameter structure, the initial neural network model is trained so that the loss value of the model is at a relatively low level. The second stage is: expanding the cycle shared parameter structure, and continuing training the model until convergence.

Figure 9:
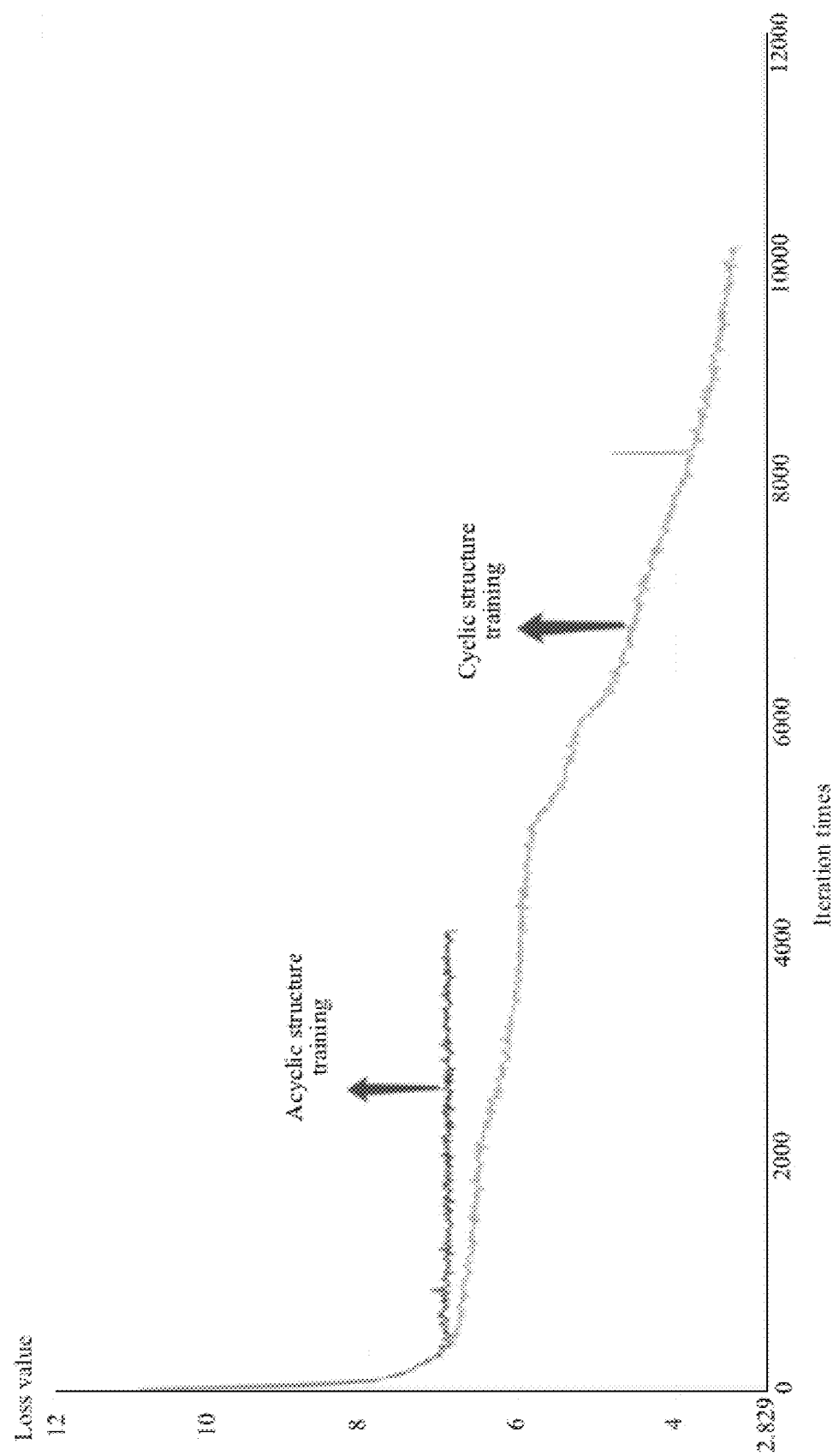
FIG. 9 is a schematic diagram of convergence effects after pre-training with an acyclic structure and a cyclic structure according to an embodiment of the present disclosure.

As an example, when the initial neural network model has the PostLN structure, the initial neural network model is trained by using an acyclic structure and a cyclic structure. The convergence effect after training is shown in FIG. 9. It can be seen that the cyclic structure is used to train the model, and the convergence effect is better, and it can effectively solve the problem that the model of PostLN structure cannot converge normally when the amount of parameters is large.

In the pre-training of the neural network model of the embodiment of the disclosure, the initial neural network model is pre-trained by adopting a cyclic method. Due to the cyclic structure, the dependence between gradients is enhanced, and the disappearance of the gradient can be solved to a certain extent and the effectiveness of convergence is ensured.

In the embodiments of this disclosure, deep learning methods or machine learning methods in the AI field can be used to pre-train the initial neural network model, where artificial intelligence is the study of using computers to simulate certain thinking processes and intelligence behavior of people (such as learning, reasoning, thinking, planning, etc.) They include both hardware-level technologies and software-level technologies. AI hardware technologies generally include sensors, dedicated AI chips, cloud computing, distributed storage, and big data processing; AI software technologies mainly include computer vision technology, speech recognition technology, natural language processing technology, and machine learning/depth leaning, big data processing technology, and knowledge graph technology.

Corresponding to the pre-training method of the neural network model provided in the above-mentioned embodiments of FIGS. 6 to 8, the present disclosure further provides a pre-training device of neural network model. The pre-training device corresponds to the pre-training method of the neural network model provided in the embodiments of FIGS. 6 to 8, so the implementation of the pre-training method of the neural network model is also applicable to the pre-training device of the neural network model provided in the embodiment of the present disclosure, which is not repeated in the embodiment of the present disclosure.

Figure 10:
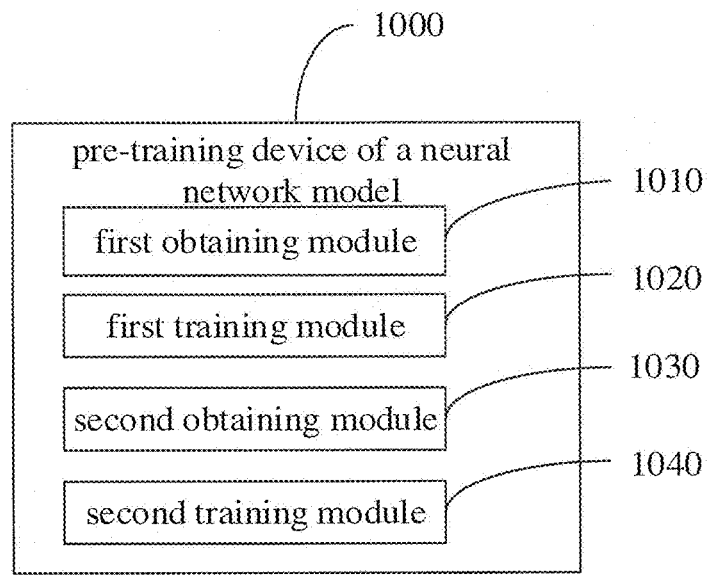
FIG. 10 is a schematic structural diagram of a pre-training device of the neural network model according to the fourth embodiment of the present disclosure.

FIG. 10 is a schematic structural diagram of a pre-training device of a neural network model according to the fourth embodiment of the disclosure.

As shown in FIG. 10, the pre-training device 1000 of the neural network model may include: a first obtaining module 1010, a first training module 1020, a second obtaining module 1030, and a second training module 1040.

The first obtaining module 1010 is used to obtain pre-training data.

The first training module 1020 is used to input the pre-training data to the initial neural network model, and pre-training the initial neural network model in the first training mode, where a plurality of hidden layers in the first training mode share one hidden layer parameter.

The second obtaining module 1030 is used to obtain a loss value of the initial neural network model.

The second training module 1040 is used to continue pre-training the initial neural network model in the second training mode if the loss value of the initial neural network model is less than the preset threshold. Each of the plurality of hidden layers has a hidden layer parameter in the second training mode.

In a possible implementation of the embodiment of the present disclosure, the first training module 1020 is specifically used to: obtain a number of hidden layers; generate a number of cycling in the first training mode according to the number of hidden layers; implement cyclical pre-training on the initial neural network model in the first training mode according to the number of cycling.

In a possible implementation of the embodiment of the present disclosure, the number of cycling is the number of hidden layers.

In a possible implementation of the embodiment of the present disclosure, each hidden layer accumulates the gradient value generated by itself to the shared hidden layer parameter.

In a possible implementation of the embodiment of the present disclosure, the second obtaining module 1030 is specifically used to: mask part of the pre-training data; and input the pre-training data after the masking into the initial neural network model for prediction to generate a predicted value; compare the predicted value with the initial value at the masking position to generate a loss value.

In the pre-training device of the neural network model of the embodiment of the disclosure, the pre-training data is inputted into the initial neural network model, and the initial neural network model is pre-trained in the first training mode, in the first training mode, the plurality of hidden layers share one hidden layer parameter and the loss value of the initial neural network model is obtained. If the loss value of the initial neural network model is less than the preset threshold, the initial neural network model will continue to be pre-trained in the second training mode. In the second training mode, each of the plurality hidden layers has a hidden layer parameter. Therefore, the pre-training is divided into two stages. In the first stage, each hidden layer shares the same hidden layer parameters. Compared with the corresponding hidden layer parameters being used by each hidden layer, the number of parameters is relatively reduced. Therefore, during the pre-training, the instability caused by parameter updates can be reduced, and the convergence effect of the model can be improved. In the second stage, the corresponding hidden layer parameters are used by each hidden layer, the prediction effect of the model may be improved. That is, this device can not only improve the convergence effect of the model, but also improve the prediction effect of the model.

In order to implement the above-mentioned embodiments, the present disclosure also provides an electronic device, which may include at least one processor; and a memory communicatively connected with the at least one processor. Instructions are stored in the memory and executed by at least one processor to implement the pre-training method of neural network model according to the embodiments of the present disclosure.

In order to implement the above-mentioned embodiments, the present disclosure further provides a non-transitory computer-readable storage medium storing computer instructions, where the computer instructions are executed by a computer to implement the pre-training method of neural network model according to the embodiments of the present disclosure.

In order to implement the above-mentioned embodiments, this present disclosure further provides a computer program product, which includes a computer program, and the computer program is executed by a processor to implement the pre-training method of neural network model according to the embodiments of the present disclosure.

According to the embodiments of the present disclosure, the present disclosure also provides an electronic device, a readable storage medium, and a computer program product.

Figure 11:
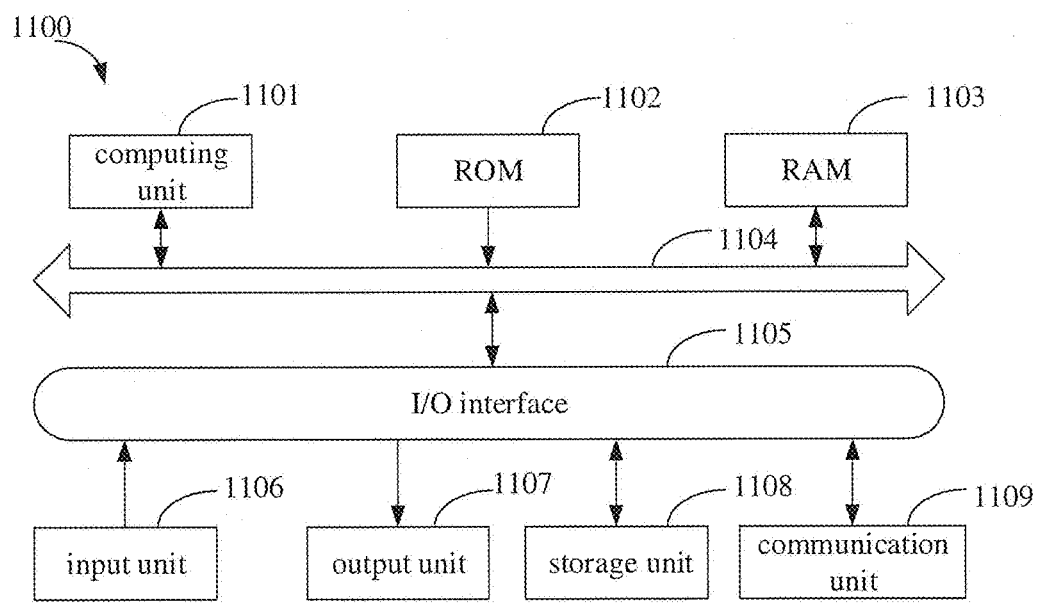
FIG. 11 is a schematic block diagram of an electronic device that can be used to implement the embodiment of the present disclosure.

FIG. 11 shows a schematic block diagram of an electronic device 1100 that can be used to implement embodiments of the present disclosure. Electronic device is intended to represent various forms of digital computers, such as laptop computers, desktop computers, workstations, personal digital assistants, servers, blade servers, mainframe computers, and other suitable computers. Electronic device can also represent various forms of mobile devices, such as personal digital processing, cellular phones, smart phones, wearable devices, and other similar computing devices. The connections, relationships and functions of components shown herein are merely examples, and are not intended to limit the implementation described and/or required in the disclosure.

As shown in FIG. 11, the device 1100 includes a computing unit 1101, which can perform various appropriate actions and processing based on a computer program stored in Read-Only Memory (ROM) 1102 and a computer program loaded into Random Access Memory (RAM) from a storage unit 1108. In the RAM 1103, various programs and data required for the operation of the device 1100 can also be stored. The computing unit 1101, the ROM 1102, and the RAM 1103 are connected to each other through a bus 1104. An Input/Output (I/O) interface 1105 is also connected to the bus 1104.

A number of components in the device 1100 are connected to the I/O interface 1105, including: an input unit 1106, such as a keyboard, a mouse; an output unit 1107, such as various types of displays, speakers; and a storage unit 1108, such as a disk, an optical disc; and a communication unit 1109, such as network card, modem, wireless communication transceiver. The communication unit 1109 allows the device 1100 to exchange information/data with other devices through a computer network such as the Internet and/or various telecommunication networks.

The computing unit 1101 may be various general-purpose and/or special-purpose processing components with processing and computing capabilities. Some examples of the computing unit 1101 include, but are not limited to, Central Processing Unit (CPU), Graphic Processing Unit (GPU), various dedicated AI computing chips, various calculation units implementing the machine learning model algorithm, Digital Signal Processor (DSP), and any suitable processor, controller, microcontroller, etc. The calculation unit 1101 executes the various methods and processes described above, such as the above-mentioned pre-training method of the neural network model. For example, in some embodiments, the aforementioned pre-training method of the neural network model may be implemented as a computer software program, which is tangibly contained in a machine-readable medium, such as the storage unit 1108. In some embodiments, part or all of the computer program may be loaded and/or installed on the device 1100 via the ROM 1102 and/or the communication unit 1109. When the computer program is loaded into the RAM 1103 and executed by the computing unit 1101, one or more steps of the pre-training method of the neural network model described above can be executed. Alternatively, in other embodiments, the computing unit 1101 may be used to perform the above-mentioned pre-training method of the neural network model in any other suitable manner (for example, by means of firmware).

The various implementations of the systems and technologies described in this disclosure can be implemented in digital electronic circuit systems, integrated circuit systems, Field Programmable Gate Array (FPGA), Application-Specific Integrated Circuit (ASIC), Application Specific Standard Product (ASSP), System On Chip (SOC), Complex Programmable Logic Device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor can be a dedicated or general-purpose programmable processor that can receive data and instructions from the storage system, at least one input device, and at least one output device, and transmit the data and instructions to the storage system, the at least one input device, and the at least one output device.

The program code used to implement the method of the present disclosure can be written in any combination of one or more programming languages. These program codes can be provided to the processors or controllers of general-purpose computers, special-purpose computers, or other programmable data processing devices, so that when the program codes are executed by the processors or controllers, the functions/operations specified in the flowcharts and/or block diagrams are implemented. The program code can be executed entirely on the machine, partly executed on the machine, partly executed on the machine and partly executed on the remote machine as an independent software package, or entirely executed on the remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, devices, or apparatuses, or any suitable combination thereof. More specific examples of machine-readable storage medium would include electrical connections based on one or more wires, portable computer disks, hard drives, RAM, ROM, Electrically Programmable Read-Only-Memory (EPROM), flash memory, optical fiber, Compact Disc Read-Only Memory (CD-ROM), optical storage device, magnetic storage device, or any suitable combination thereof.

In order to provide interaction with the user, the system and technology described here can be implemented on a computer that has: a display device for displaying information to the user (for example, Cathode-Ray Tube (CRT) or Liquid Crystal Display (LCD); and keyboard and pointing device (for example, mouse or trackball), the user can provide input to the computer through the keyboard and pointing device. Other types of devices can also be used to provide interaction with the user; for example, the feedback provided to the user can be any form of sensory feedback (for example, visual feedback, auditory feedback, or tactile feedback); and can receive input from the user in any form (including acoustic input, voice input, or tactile input).

The systems and technologies described here can be implemented in a computing system that includes back-end components (for example, as a data server), or a computing system that includes middleware components (for example, an application server), or a computing system that includes front-end components (for example, a user computer with a graphical user interface or a web browser through which the user can interact with the implementation of the system and technology described herein), or a computer system including any combination of the back-end components, middleware components and front-end components. The components of the system can be connected to each other through any form or medium of digital data communication (for example, a communication network). Examples of communication networks include: Local Area Network (LAN), Wide Area Network (WAN), Internet, and block chain networks.

Computer systems can include clients and servers. The client and server are generally far away from each other and usually interact through a communication network. The relationship between the client and the server is generated by computer programs that run on the corresponding computers and have a client-server relationship with each other. The server can be a cloud server, also known as a cloud computing server or a cloud host, which is a host product in the cloud computing service system to solve the problem of large management difficulty and weak business scalability in traditional physical host and Virtual Private Server (VPS). The server can also be a server of a distributed system, or a server combined with a block chain.

It needs to be explained that AI is the study of making computers to simulate certain thinking processes and intelligent behaviors of people (such as learning, reasoning, thinking, planning, etc.). It has both hardware-level technology and software-level technology. AI hardware technologies generally include technologies such as sensors, dedicated artificial intelligence chips, cloud computing, distributed storage, and big data processing; AI software technologies mainly include computer vision technology, speech recognition technology, natural language processing technology, and machine learning/depth learning, big data processing technology, and knowledge graph technology.

According to the technical solution of the embodiments of the present disclosure, the pre-training data is inputted into the initial neural network model, and the initial neural network model is pre-trained in the first training mode, in the first training mode, the plurality of hidden layers share one hidden layer parameter and the loss value of the initial neural network model is obtained. If the loss value of the initial neural network model is less than the preset threshold, the initial neural network model will continue to be pre-trained in the second training mode. Among them, each of the plurality hidden layers in the second training mode has a hidden layer parameter. Therefore, the pre-training is divided into two stages. In the first stage, each hidden layer shares the same hidden layer parameters. Compared with the corresponding hidden layer parameters being used by each hidden layer, the number of parameters is relatively reduced. Therefore, during the pre-training, the instability caused by parameter updates can be reduced, and the convergence effect of the model can be improved. In the second stage, the corresponding hidden layer parameters are used by each hidden layer, the prediction effect of the model may be improved. That is, this method can not only improve the convergence effect of the model, but also improve the prediction effect of the model.

It should be understood that the various forms of processes shown above can be reordered, a step may be added or deleted. For example, the steps described in the present disclosure can be performed in parallel, sequentially, or in a different order, as long as the desired result of the technical solution disclosed in the present disclosure can be achieved, which is not limited herein.

The above specific implementations do not constitute a limitation to the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A pre-training method of a neural network model, the neural network model is a machine translation model used in a scenario where a first language and a second language are mutually translated, and the method comprising:

obtaining pre-training data, wherein text information in each pre-training data can be text information in the same language, or text information in different languages;

inputting the pre-training data to an initial neural network model, and pre-training the initial neural network model in a first training mode, wherein a plurality of hidden layers in the first training mode share a common hidden layer parameter;

obtaining a loss value of the initial neural network model; and when the loss value of the initial neural network model is less than a preset threshold, continuing pre-training the initial neural network model in a second training mode, wherein each of the plurality of hidden layers in the second training mode has a hidden layer parameter;

wherein pre-training the initial neural network model in the first training mode comprises: obtaining a number of the plurality of hidden layers; generating a number of cyclings in the first training mode based on the number of the plurality of hidden layers; and implementing cyclical pre-training on the initial neural network model in the first training mode based on the number of cyclings; and wherein in each cycling of the number of cyclings in the first training mode, each hidden layer accumulates a gradient value generated by itself to the common hidden layer parameter to jointly modify the common hidden layer parameter to obtain an updated common hidden layer parameter, and the updated common hidden layer parameter is used as the common hidden layer parameter used by each hidden layer in a next cycling.

2. The method according to claim 1, wherein the number of cyclings is the number of the plurality of hidden layers.

3. The method according to claim 1, wherein obtaining the loss value of the initial neural network model comprises:
masking part of the pre-training data;
inputting the pre-training data after the masking into the initial neural network model for prediction, to generate a predicted value;
comparing the predicted value with an initial value at a masking position to generate the loss value.

4. The method according to claim 3, wherein masking part of the pre-training data comprises:
implementing one of replacement processing and deletion processing on the part of the pre-training data.

5. The method according to claim 3, wherein comparing the predicted value with an initial value at a masking position to generate the loss value comprises:
calculating a similarity between the predicted value and the initial value;
determining a difference between the predicted value and the initial value based on the similarity; and
generating the loss value based on the difference.

6. An electronic device, comprising:
at least one processor;
a memory connected to the at least one processor; wherein the memory stores instructions executable by the at least one processor to implement the pre-training method of a neural network model, the neural network model is a machine translation model used in a scenario where a first language and a second language are mutually translated, and the pre-training method comprising:
obtaining pre-training data;
inputting the pre-training data to an initial neural network model, and pre-training the initial neural network model in a first training mode, wherein a plurality of hidden layers in the first training mode share a common hidden layer parameter;
obtaining a loss value of the initial neural network model; and
when the loss value of the initial neural network model is less than a preset threshold, continuing pre-training the initial neural network model in a second training mode, wherein each of the plurality of hidden layers in the second training mode has a hidden layer parameter;
wherein pre-training the initial neural network model in the first training mode comprises: obtaining a number of the plurality of hidden layers; generating a number of cyclings in the first training mode based on the number of the plurality of hidden layers; and implementing cyclical pre-training on the initial neural network model in the first training mode based on the number of cyclings; and wherein in each cycling of the number of cyclings in the first training mode, each hidden layer accumulates a gradient value generated by itself to the common hidden layer parameter to jointly modify the common hidden layer parameter to obtain an updated common hidden layer parameter, and the updated common hidden layer parameter is used as the common hidden layer parameter used by each hidden layer in a next cycling.

7. The device according to claim 6, wherein the number of cyclings is the number of the plurality of hidden layers.

8. The device according to claim 6, wherein obtaining the loss value of the initial neural network model comprises:
masking part of the pre-training data;
inputting the pre-training data after the masking into the initial neural network model for prediction, to generate a predicted value;
comparing the predicted value with an initial value at a masking position to generate the loss value.

9. The device according to claim 8, wherein masking part of the pre-training data comprises:
implementing one of replacement processing and deletion processing on the part of the pre-training data.

10. The device according to claim 8, wherein comparing the predicted value with an initial value at a masking position to generate the loss value comprises:
calculating a similarity between the predicted value and the initial value;
determining a difference between the predicted value and the initial value based on the similarity; and
generating the loss value based on the difference.

11. A non-transitory computer readable storage medium storing computer instructions, wherein the computer instructions are executed by a computer to implement the pre-training method of a neural network model, the neural network model is a machine translation model used in a scenario where a first language and a second language are mutually translated, and the pre-training method comprising:
obtaining pre-training data, wherein text information in each pre-training data can be text information in the same language, or text information in different languages;
inputting the pre-training data to an initial neural network model, and pre-training the initial neural network model in a first training mode, wherein a plurality of hidden layers in the first training mode share a common hidden layer parameter;
obtaining a loss value of the initial neural network model; and
when the loss value of the initial neural network model is less than a preset threshold, continuing pre-training the initial neural network model in a second training mode, wherein each of the plurality of hidden layers in the second training mode has a hidden layer parameter;
wherein pre-training the initial neural network model in the first training mode comprises: obtaining a number of the plurality of hidden layers; generating a number of cyclings in the first training mode based on the number of the plurality of hidden layers; and implementing cyclical pre-training on the initial neural network model in the first training mode based on the number of cyclings;

wherein in each cycling of the number of cyclings in the first training mode, each hidden layer accumulates a gradient value generated by itself to the common hidden layer parameter to jointly modify the common hidden layer parameter to obtain an updated common hidden layer parameter, and the updated common hidden layer parameter is used as the common hidden layer parameter used by each hidden layer in a next cycling.

12. The storage medium according to claim 11, wherein the number of cyclings is the number of the plurality of hidden layers.

13. The storage medium according to claim 11, wherein the obtaining the loss value of the initial neural network model comprises:

masking part of the pre-training data;

inputting the pre-training data after the masking into the initial neural network model for prediction, to generate a predicted value;

comparing the predicted value with an initial value at a masking position to generate the loss value.

14. The storage medium according to claim 13, wherein masking part of the pre-training data comprises:

implementing one of replacement processing and deletion processing on the part of the pre-training data.

* * * * *